United States Patent

[11] 3,632,076

| [72] | Inventor | Thomas J. Rogers, Jr.<br>P.O. Box 36727, Houston, Tex. 77036 |
|---|---|---|
| [21] | Appl. No. | 9,630 |
| [22] | Filed | Feb. 9, 1970 |
| [45] | Patented | Jan. 4, 1972 |

[54] SELF-LEVELING SEAT STRUCTURE
2 Claims, 4 Drawing Figs.

[52] U.S. Cl. ................................................ 248/371
[51] Int. Cl. .............................................. F16m 13/00
[50] Field of Search........................................... 248/133,
139, 182, 185, 371, 372, 378, 382, 398, 400;
297/314; 188/313

[56] References Cited
UNITED STATES PATENTS

| 138,598 | 5/1873 | Winecoff.................... | 297/314 |
| 157,753 | 12/1874 | Hildreth...................... | 248/753 |
| 1,572,484 | 2/1926 | Homar......................... | 188/313 |
| 2,284,352 | 5/1942 | Zank............................ | 248/400 X |
| 2,770,286 | 11/1956 | Weller......................... | 297/314 |

FOREIGN PATENTS

| 803,930 | 2/1951 | Germany..................... | 248/371 |

Primary Examiner—William H. Schultz
Attorneys—James F. Weiler, Jefferson D. Giller, William A. Stout, Paul L. De Verter, II, Dudley R. Dobie, Jr. and Henry W. Hope ABSTRACT: An improved self-leveling seat assembly for tractors and the like having a seat member, a support member, means such as rollers and arcuate track guides securing the seat to the support and providing limited movement of the seat relative to the support along an arc of a circle in response to angularity of the support member relative to angularity of the support member relative to the horizontal, and a piston and cylinder combination secured to the seat member and to the support member for purposes of dampening movement of the seat relative to the support.

PATENTED JAN 4 1972

3,632,076

Thomas J. Rogers, Jr.
INVENTOR.

BY James F. Weiler
William A. Stout
Dudley R. Dobie, Jr.
Henry W. Hope
ATTORNEYS 3,632,076

SELF-LEVELING SEAT STRUCTURE

BACKGROUND OF THE INVENTION

Numerous types of tractor and ground maintenance equipment must operate over rough, inclined or otherwise nonlevel surfaces such as highway rights-of-way and the like. The operators of such equipment often experience physical discomfort, low back pain, muscular aches and general fatigue due to steep slopes and inclines. In addition, operation of maintenance equipment by an operator who must sit in an angular or awkward position involves inherent safety hazards due to imbalance of the operator since the operator tends to sit upright while the tractor or equipment he is operating is in an inclined relationship with the horizontal.

Conventional devices for automatically leveling the seats of tractors have perhaps accomplished the leveling function but have suffered the disadvantage of causing sudden corrections of the seat as well as uncontrollable oscillations when responding to changes of angularity of the seat relative to the horizontal. Naturally, the sudden corrections and/or subsequent uncontrollable oscillations pose additional serious hazards as is well appreciated. Further problems are created when an operator of heavy weight attempts to use a conventional self-leveling seat designed for a lighter person. In such a situation, the effects of sudden corrections are attenuated and the risks to life and limb are increased.

It would be highly advantageous to provide a self-leveling seat structure for use with tractors, maintenance equipment and the like which not only effectively perform a leveling function but provide means to dampen sudden corrections and oscillations while at the same time being adjustable so as to regulate the degree of dampening desired according to the weight of the operator or the terrain to be traveled.

SUMMARY OF THE PRESENT INVENTION

The present invention is directed to an improvement over conventional self-leveling seat devices for tractors and the like. In the device of the present invention, a posterior-receiving seat member is secured to a support member (that may be attached to a tractor or the like) by means such as rollers engaging arcuate tracks so as to provide limited movement of the seat member in a lateral direction along an arc of a circle in response to angularity of the support member relative to the horizontal. Movements of the seat member in relation to the support member are controlled through the provision of a piston and cylinder combination secured to both the seat and support members for dampening movements of the seat. The degree of damping may be regulated as desired through the provision of means such as a bypass line for hydraulic fluid flow around the piston and an adjustable valve within such bypass line.

It is, therefore, an object of the present invention to provide a self-leveling seat structure for tractors and the like wherein the seat will assume a position level relative to the horizontal and speed of movement of the seat in assuming such level position is regulated by dampening means for purposes of eliminating sudden corrections of the seat and uncontrollable oscillations thereof.

Still another object of the present invention is the provision of such a self-leveling seat device having a seat member, a support member, piston and cylinder means in hydraulic relation and valving means regulating speed of travel of the piston within the cylinder to in turn regulate movement of the seat relative to the support.

Other and further objects, features and advantages will be apparent in the following description of preferred embodiments of the invention, given for the purpose of disclosure and taken in conjunction with the accompanying drawings.

DESCRIPTION OF THE DRAWINGS

In the drawings forming a part of the disclosure herein, like character references designate like parts throughout the several views, wherein.

DESCRIPTION OF THE PREFERRED EMBODIMENT

Figure 1:
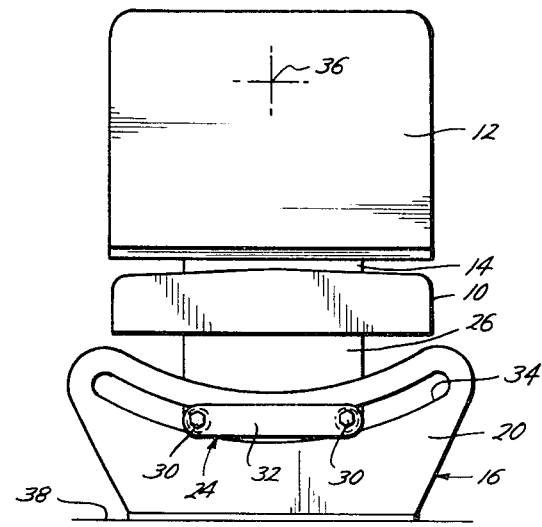
FIG. 1 is a partial front elevational view of a self-leveling seat structure according to the present invention.

With reference to each of the figures of the drawings, a seat member 10 is shown with a conventional back support 12 attached to the seat such as by means of a brace 14. Beneath the seat is a support member 16 having a pair of upwardly projecting walls 18 and 20, the relationship of each of which is best viewed in FIG. 2. The walls 18 and 20 are oriented transversely of the seat member, i.e., extend transversely of the front to rear direction of the seat member.

With continued reference to the drawings and particularly FIG. 2, truck members 22 and 24 are secured to and below the seat member 10 such as by means of a suitable bracket 26. Each truck member includes rollers 28 rotatably journaled to the bracket 26 such as by means of suitable bolts 30. The pairs of bolts 30 on each truck 22 and 24 are supported in spaced relationship not only by the bracket 26 but also by spreader bars 32 as shown in each of the figures.

Figure 3:
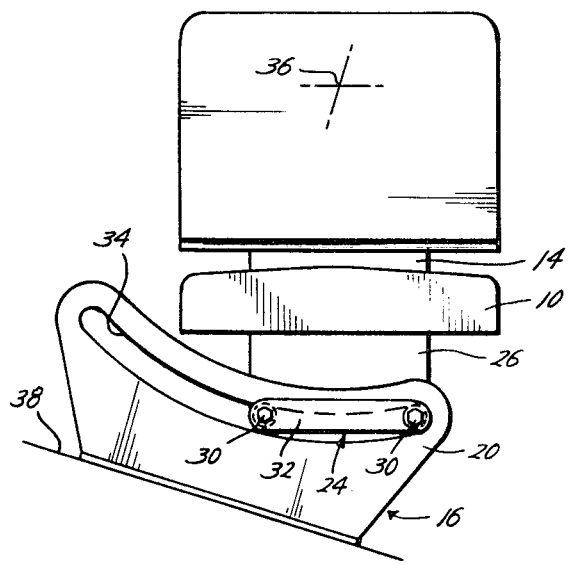
FIG. 3 is a partial front elevational view showing the seat in a level position in response to angularity of the support position.

Both of the walls 18 and 20 of the support 16 are provided with an arcuate slot 34, the center of curvature of which is above the seat member 10 as indicated by the reference point 36 in FIGS. 1 and 3. The rollers 28 of each of the trucks 22 and 24 slidably engage within their respective arcuate slots 34 of the walls of the support member to provide limited movement of the seat member 10 relative to the support member 16 along an arc of a circle defined by the center 36 in response to angularity of the support member 16 relative to the horizontal. Thus, when the vehicle such as a tractor 38 is inclined as shown in FIG. 3, the seat 10, by means of its rollers 28 of each truck, assumes a level position since the weight of the operator is oriented in a vertical direction.

Figure 2:
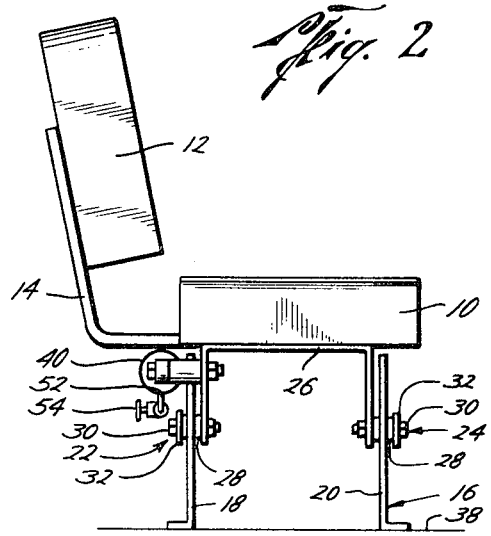
FIG. 2 is a side elevational view of such a structure also illustrating means for dampening movement of the seat relative to the horizontal.
Figure 4:
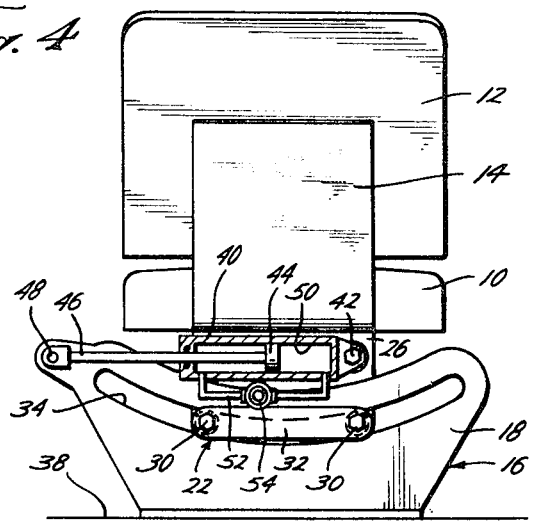
FIG. 4 is a rear elevational view partially in cross section showing the self-leveling seat structure and the piston and cylinder arrangement for regulating movement of the seat.

As best shown in FIG. 4 but also in FIG. 2, a cylinder member 40 is pivotally secured such as by a bolt 42 to the seat member structure and receives a piston member 44 that is attached to one end of a rod 46, the other end of the rod being pivotally secured such as by means of a bolt 48 to the wall 18 of the support member 16. As shown in FIG. 4, the rod 46 slidably engages with and through one end of the cylinder 40 preferably in a fluidtight manner in order that hydraulic fluid may fill the bore 50 of the cylinder.

With further reference to FIG. 4, hydraulic fluid bypass and valve means are provided to regulate hydraulic fluid communication to either side of the piston 44 within the cylinder 40 in response to movement of the piston therein. Such communication is provided by means of a bypass line 52 in which is provided an adjustable valve 54 for regulating fluid flow through the line 52. The bypass line 52 provides fluid communication from one interior end of the cylinder 40 to the other interior end thereof and it will now be recognized that the length of the arcuate slot 34 and length of the piston rod 46 should be such that the piston 44 may travel between but not obstruct either end of the bypass line 52 so as to assure flow of hydraulic fluid from the cylinder bore 50 into both ends of the bypass line 52.

In operation, the self-leveling seat structure may be secured such as by bolting, welding, etc., to the housing 38 of a vehicle such as a tractor. When the vehicle is placed in operation and encounters a slope, the seat member 10 slides by means of its rollers 28 within the arcuate slots 34 to a level position as shown, for example, in FIG. 3. Speed of movement of the seat 10 in response to angularity of the support member relative to the horizontal may be regulated by adjusting the valve 54 in the bypass line 52 as shown in FIG. 4 so that hydraulic fluid trapped on one side of the piston 44 within the cylinder bore 50 flows at a controlled rate through the bypass line 52 to the other side of the piston in the cylinder bore. Thus, if a relatively heavy person is seated on the seat 10, the valve 54 is adjusted to restrict flow of fluid in the bypass line 52. On the other hand, if a relatively lightweight person is seated on the seat 10, the valve 54 is opened to provide less restriction in the bypass line 52 thereby permitting freer flow of fluid from one side of the piston 44 to the other. The resulting advantage is that speed of movement of the seat 10 relative to the support member 16 in response to changes of angularity may be made the same for persons of differing weights, simply by regulating flow of hydraulic fluid through the valve 54.

It will be appreciated that any suitable hydraulic fluid may be used within the cylinder 50. It will also be appreciated that the valve and bypass line combination may be varied in arrangement and configuration. Furthermore, in still other embodiments of the invention, hydraulic fluid may be eliminated and suitable pneumatic vent-valve means provided in combination with the cylinder 40 for purposes of regulating speed of movement of the piston 44 within the cylinder bore 50.

In still other embodiments, if it is desired that the speed of movement of the seat 10 relative to the support 16 be dampened at a fairly constant rate, the bypass line 52 may be eliminated and bleed hole means provided within the piston 44 for purposes of bleeding hydraulic fluid or air from one side of the piston to the other as it slides within the cylinder bore 50. Thus it will be recognized that many variations of the piston-cylinder means of the present invention may be provided for regulating dampening effect of movement of the seat 10.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:

1. A self-leveling seat assembly for tractors and the like, including,
   a. a posterior-receiving seat member,
   b. a support member beneath the seat member,
   c. roller and arcuate track guide means securing the seat member to the support member and providing limited movement of the seat member in a lateral direction relative to said member along an arc of a circle in response to angularity of the support member relative to the horizontal,
   d. piston and cylinder means secured to the seat member and to the support member for dampening movement of the seat member relative to the support member, said means including
      i. a piston member secured to one end of a rod, the other end of the rod being pivotally secured to either of the seat or support members, and
      ii. a cylinder member receiving the piston and adapted at one end to slidably engage the rod, the other end of the cylinder being pivotally secured to either of the seat or support members to which the rod is not attached,
   e. hydraulic fluid within the cylinder on either side of the piston, and
   f. hydraulic fluid bypass and valve means which comprise,
      i. a conduit exteriorly of the cylinder providing fluid communication from one interior end of the cylinder to the other interior end of the cylinder, and
      ii. a valve in said conduit for regulating fluid flow therethrough.

2. A self-leveling seat assembly for tractors and the like, including,
   a. a posterior-receiving seat member,
   b. a support member attachable to the tractor beneath the seat member, said support member having a pair of upwardly projecting walls oriented transversely of the seat member, each wall having an arcuate slot the center of curvature of which is above the seat member,
   c. a pair of truck members secured to the seat member, each truck having rollers slidably engaging within one of the arcuate slots of a wall of the support member,
   d. piston and cylinder means secured to the seat member and to the support member for dampening sliding movement of the rollers within the arcuate slots in response to angularity of the support member relative to the horizontal, said means including,
      i. a piston member secured to one end of a rod, the other end of the rod being pivotally secured to either of the seat or support members, and
      ii. a cylinder member receiving the piston and adapted at one end to slidably engage the rod, the other end of the cylinder being pivotally secured to either of the seat or support members to which the rod is not attached,
   e. hydraulic fluid within the cylinder on either side of the piston, and
   f. hydraulic fluid bypass and valve means which comprises,
      i. a conduit exteriorly of the cylinder providing fluid communication from one interior end of the cylinder to the other interior end of the cylinder, and
      ii. a valve in said conduit for regulating fluid flow therethrough.

* * * * *